(12) United States Patent
McMillan (10) Patent No.: US 8,517,426 B2
(45) Date of Patent: Aug. 27, 2013

(54) FAN ACCESSORY UNIT FOR A MOTORCYCLE

(76) Inventor: George Erik McMillan, Hickory, NC (US)

(*) Notice: Subject to any disclaimer, the term of this patent is extended or adjusted under 35 U.S.C. 154(b) by 118 days.

(21) Appl. No.: 13/035,204

(22) Filed: Feb. 25, 2011

(65) Prior Publication Data

US 2011/0203862 A1 Aug. 25, 2011

Related U.S. Application Data

(60) Provisional application No. 61/307,951, filed on Feb. 25, 2010.

(51) Int. Cl.
*B62D 25/18* (2006.01)
(52) U.S. Cl.
USPC .......................................... 280/848; 180/229
(58) Field of Classification Search
USPC .............. 180/229, 219, 218, 68.4, 68.1, 215; 280/288.4, 848
See application file for complete search history.

(56) References Cited

U.S. PATENT DOCUMENTS

| | | | | |
|---|---|---|---|---|
| 4,535,866 A | * | 8/1985 | Shiga | 180/215 |
| 4,703,825 A | * | 11/1987 | Mikami et al. | 180/229 |
| 4,770,262 A | * | 9/1988 | Yasunaga et al. | 180/68.1 |
| 4,971,171 A | * | 11/1990 | Yamada et al. | 180/68.1 |
| 5,477,208 A | * | 12/1995 | Henderson et al. | 340/471 |
| 6,294,984 B1 | | 9/2001 | Meister | |
| 7,665,566 B2 | * | 2/2010 | Okada et al. | 180/291 |
| 8,261,685 B2 | * | 9/2012 | Nishimoto et al. | 116/59 |
| 2006/0219450 A1 | * | 10/2006 | Misaki et al. | 180/68.4 |
| 2007/0107967 A1 | * | 5/2007 | Satake | 180/218 |
| 2008/0115996 A1 | * | 5/2008 | Wright et al. | 180/219 |
| 2009/0008180 A1 | * | 1/2009 | Stefanelli et al. | 180/229 |
| 2010/0012418 A1 | * | 1/2010 | Yoshizawa | 180/312 |
| 2010/0300791 A1 | | 12/2010 | Kern | |

* cited by examiner

*Primary Examiner* — Hau Phan
(74) *Attorney, Agent, or Firm* — Muncy, Geissler, Olds & Lowe PLLC (57) ABSTRACT

A motorcycle fan unit or a horn and fan combination unit includes a decorative cover having a primary surface. An optional first bracket is attached to the cover, and an optional horn is attached to the first bracket. A second bracket is attached to the cover, and a fan is attached to the second bracket. The horn and fan are located behind the cover so as to be hidden from view when the cover is viewed from an angle being approximately perpendicular to the primary surface, or when the motorcycle is viewed from its lateral side. The fan may be located behind the horn in an overlapping fashion. Also, the fan may be designed to move air along a path approximately perpendicular to the primary surface of the cover and also move air along a path approximately parallel to the primary surface of the cover.

19 Claims, 8 Drawing Sheets

FAN ACCESSORY UNIT FOR A MOTORCYCLE

This application claims the benefit of U.S. Provisional Application No. 61/307,951, filed Feb. 25, 2010, the entire contents of which are herein incorporated by reference.

BACKGROUND OF THE INVENTION

1. Field of the Invention

The present invention relates to motorcycle accessories. More particularly, the present invention relates to an improved construction for a fan unit or a horn and fan combination unit for a motorcycle.

2. Description of the Related Art

In a V-twin motorcycle engine, the heat from the front cylinder tends to radiate back onto the rear cylinder due to the air current during forward motion of the motorcycle. The problem of overheating the rear cylinder is particularly troublesome in slow moving traffic, where heat from the front cylinder slowly drifts rearward to heat the fins of the rear cylinder. Basically, the rear cylinder can become more heated than the front cylinder, because the front cylinder is exposed to the cool air in front of the motorcycle, whereas the rear cylinder is exposed to the heated air exiting the fins of the front cylinder. Overheating of the rear cylinder can cause the engine to cut off (due to overheating protection circuits) and can shorten the life of the motorcycle's engine.

In the background art, a so-called "parade" fan unit has been employed to reduce the overheating of the front and/or rear cylinders. A parade fan unit is basically an electrically powered fan, mounted to a bracket. The bracket is attached to the motorcycle's engine, e.g., by loosening or removing a bolt on the engine head, inserting a channel or mounting hole of the bracket about the bolt's mounting hole, and then replacing and/or tightening the bolt. Such a parade fan unit is large and highly visible. As such, a parade fan unit detracts from the appearance of the motorcycle. Also, because the parade fan unit is mounted directly to the engine, the engine's vibration may loosen the attachments of the supporting bracket such that the fan unit falls off. Also, the vibration tends to shorten the lifespan of the fan components (e.g., fan shaft bearings).

Another variety of auxiliary cooling device for a motorcycle in the background art is an electrically powered fan unit mounted to the frame of the motorcycle. The fan unit directs cooling air at the engine. Such a fan unit is described in U.S. Published Application 2010/0300791, which is incorporated herein by reference. Mounting the fan unit to the frame of the motorcycle, as opposed to the engine, reduces the vibration drawbacks of the parade fan unit described above, because the engine vibration transmitted to the frame is substantially reduced by vibration-dampening engine mounts. However, such a fan unit requires its own dedicated fan-to-frame mounting hardware and may be visible as an additional unit added to the motorcycle. Some riders prefer not to have a fan unit as an observable, additional unit on the motorcycle. Also, some riders prefer not to have an additional mounting bracket added to the motorcycle frame. A mounting hole in the frame is a permanent alteration, which can reduce the mechanical integrity of the frame and value of the motorcycle. A friction clamp mounting can damage the frame paint, and is viewed by some riders as having a cheap appearance.

Yet another variety of auxiliary cooling device for a motorcycle in the background art is an electrically powered fan unit mounted to the frame of the motorcycle at the hole previously used to mount the horn assembly. Such a fan unit obviates the need for new, dedicated fan-to-frame mounting hardware, since the hardware attaches to the horn mount provided by the original equipment manufacturer (OEM). Such a cooling device is marketed by LeNale Engineering (http://my-world.ebay.com/lenale-engineering) and depicted in FIG. 8.

Figure 8:
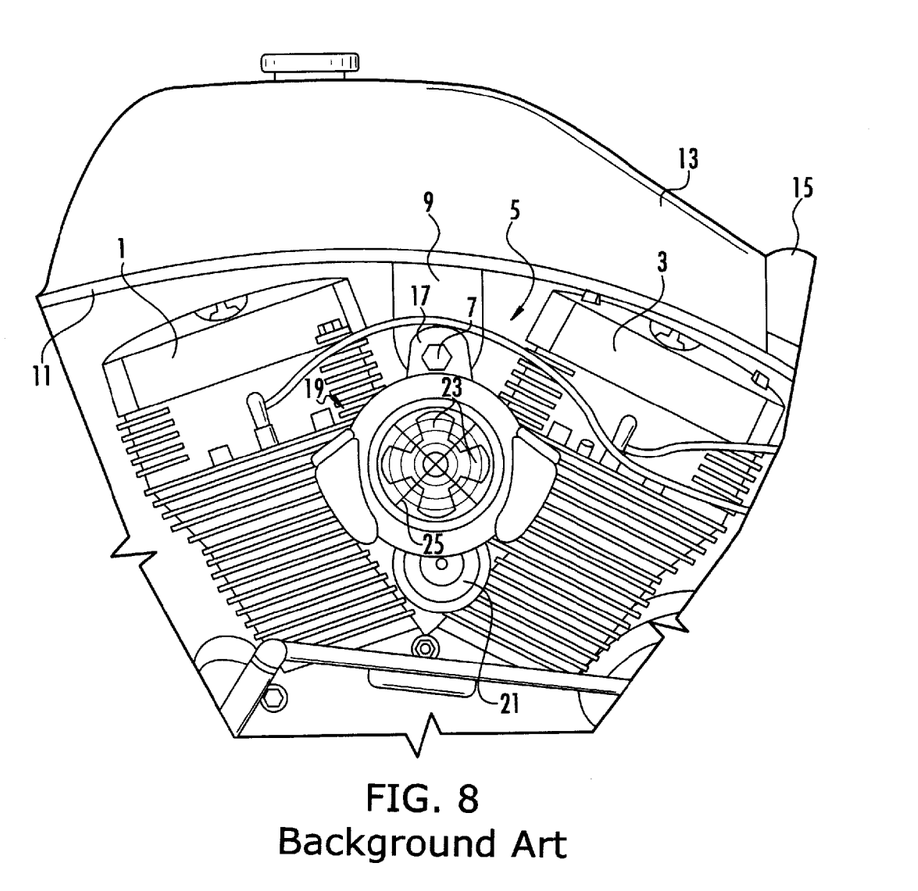
FIG. 8 is a side view of a front portion of a motorcycle with a fan and horn combination unit mounted thereto, in accordance with the background art.

As shown in FIG. 8, a front cylinder 1 and a rear cylinder 3 are disposed so as to provide a V-shaped void air space 5 therebetween. A fastener 7 (such as a bolt for engaging a nut) is passed through the mounting hole for the horn, where the mounting hole (previously used to mount the original horn unit) is formed in a downward protruding flange 9 of the motorcycle's top frame member 11. A gas tank 13 and a seat 15 may be disposed above the top frame member 11.

The fastener 7 attaches a bracket 17 to the flange 9 of the top frame member 11. The bracket 17 supports a fan unit 19. A horn 21 is positioned below the fan unit 19 and is also supported by the bracket 17. Blades 23 of the fan unit 19 are visible through a protective grill 25.

The fan 19 directs its air flow through the void air space 5 between the front and rear cylinders 1 and 3. The air flow causes a thermal break between the front cylinder 1 and the rear cylinder 3. In other words, the heated air from the front cylinder 1 is caused to exit laterally relative to the forward motion of the motorcycle. The heated air of the front cylinder 1 no longer fully impacts the cooling fins of the rear cylinder 3. Rather, cool environmental air from the lateral side of the motorcycle is drawn into the void area space 5 between the front and rear cylinders 1 and 3 and is used to supplement the cooling of the fins of the rear cylinder 3. By this arrangement, the front and rear cylinders 1 and 3 can operate at substantially the same temperature.

SUMMARY OF THE INVENTION

Although the fan units, and horn and fan combination unit, of the background art assist in reducing the temperature of the motorcycle's engine at slow speeds and at idle, the Applicant has appreciated some drawbacks in the units of the background art.

In the case of the horn and fan combination unit of the background art depicted in FIG. 8, the fan 19 is visible from the lateral side of the motorcycle through the protective grill 25. More particularly, the fan's blades 23 are visible. The fan blades 23 are not decorative, even when new, and may detract from the appearance of the motorcycle in the opinion of some riders. Also, the blades 23 will quickly become dirty since the blades 23 are impacting with large volumes of unfiltered air, which contains dust, pollen, smog/exhaust, insects, etc. The blades 23 are difficult to clean and keep clean due to the presence of the grill 25. Also, washing the blades 23 can introduce wash water into the electrical components of the fan 19 and potentially damage the fan 19.

Also, in the case of the horn and fan combination unit of FIG. 8, the horn 21 is visible from the lateral side of the motorcycle. The horn 21 is moved to a lower position on the motorcycle and is visible below the fan 19. Hence, it is evident that another structure has been added to the motorcycle. Some riders prefer not to alter the OEM (original equipment manufacturer) appearance of the motorcycle.

Also, in the case of the horn and fan combination unit of FIG. 8, a rider's pant leg can be sucked over the protective grill 25 and block the fan's intake of air through the protective grill 25 if the fan 19 is pulling air into the protective grill 25. Alternatively, if the fan 19 is exhausting through the protective grill 25, the hot air is expelled directly onto the rider's leg and may cause discomfort.

It is an object of the present invention to address one or more of the drawbacks noted above. It is another object of the present invention to provide a fan unit or a horn and fan combination unit which is simple in construction, uses few parts, may be combined with other equipment of the motorcycle to share parts (e.g., protective shields, housings, mountings, a ground wire, a wiring harness) and/or is less intrusive to the overall appearance of the motorcycle in that the combination unit may appear to be a stock or OEM accessory.

These and other objects are accomplished by a motorcycle fan unit or a horn and fan combination unit including a decorative cover having a primary surface. An optional first bracket is attached to the cover, and an optional horn is attached to the first bracket. A second bracket is attached to the cover. A fan is attached to the second bracket. In one embodiment, the horn and fan are located behind the cover so as to be hidden from view when the cover is viewed from an angle being approximately perpendicular to the primary surface, or when the motorcycle is viewed from its lateral side. In a supplemental or alternative embodiment, the fan may be located behind the horn in an overlapping fashion. In an another supplemental or alternative embodiment, the fan may be designed to move air along a path perpendicular to the primary surface of the cover and also move air along a path parallel to the primary surface of the cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
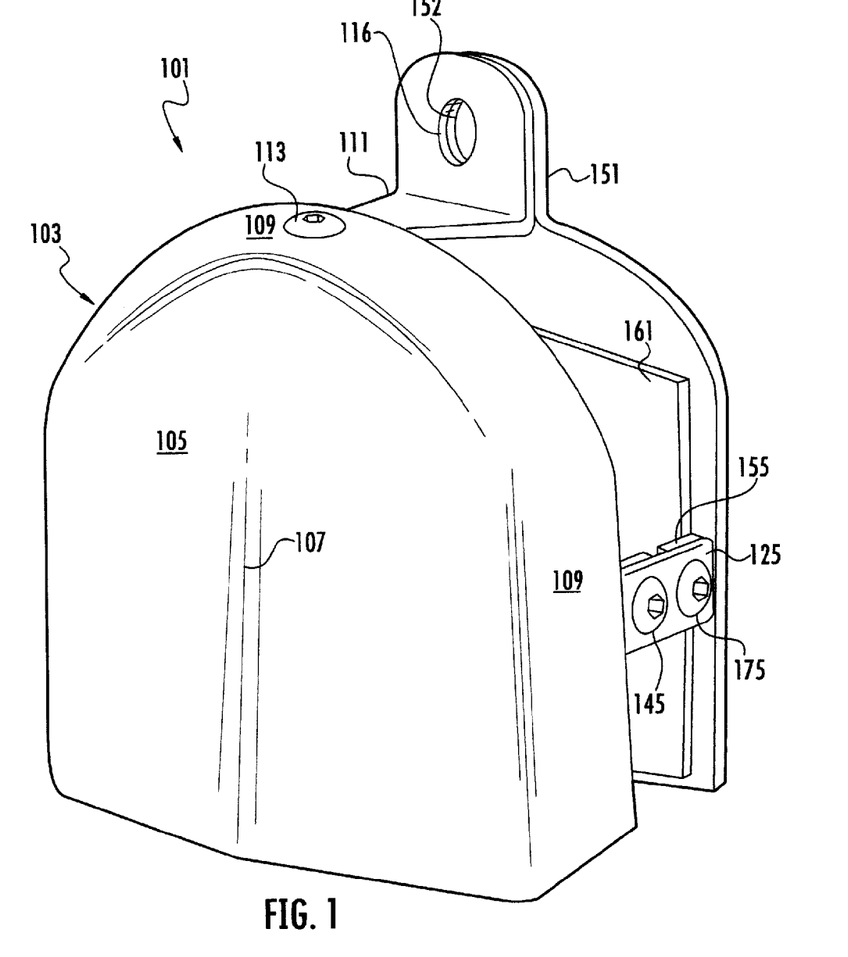
FIG. 1 is a right side perspective view of a horn and fan combination unit, in accordance with the present invention.
Figure 2:
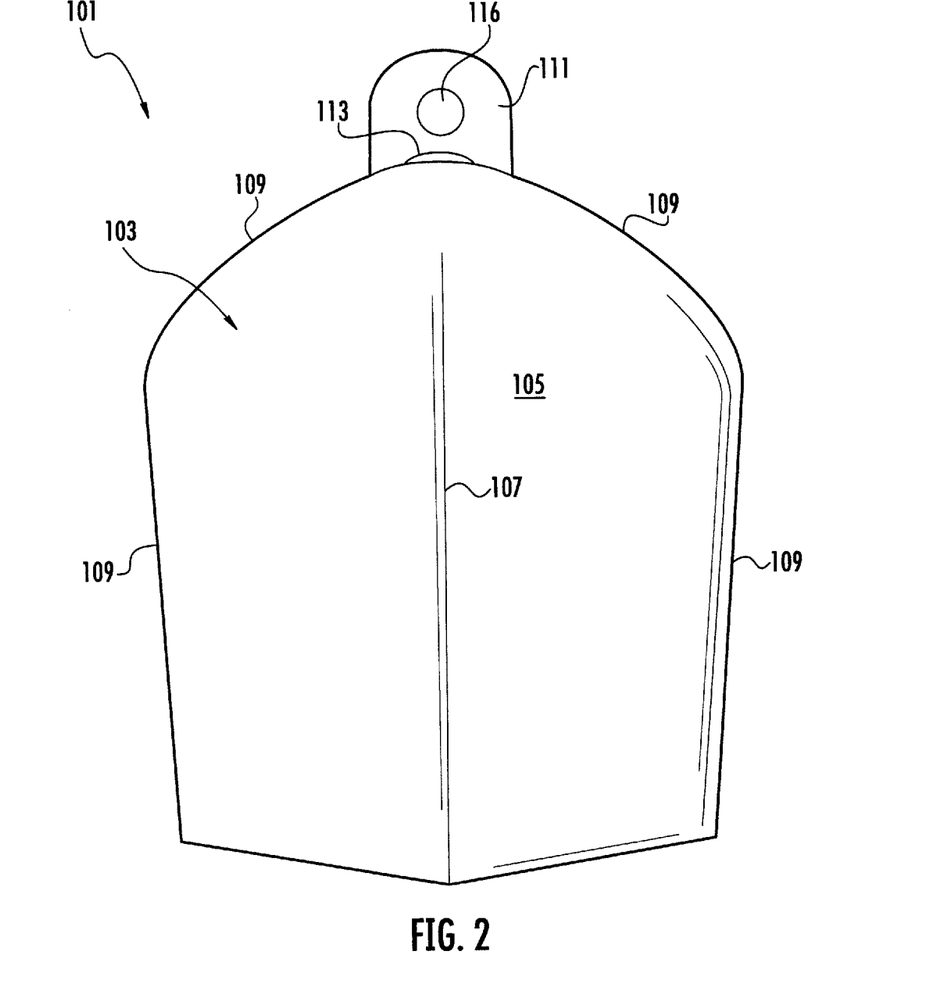
FIG. 2 is a front view of the horn and fan combination unit in FIG. 1.

FIG. 1 is a right side perspective view of a horn and fan combination unit 101, in accordance with the present invention. The unit 101 includes a decorative cover 103 having a primary surface 105. In a first embodiment, the primary surface 105 is formed as a solid surface, without openings formed therein. The primary surface 105 of said decorative cover 103 may be defined as a surface presenting the largest area of the decorative cover 103, as considered from all perspective views of said decorative cover 103 as visible to an observer of the unit 101 when mounted to a motorcycle (See FIG. 7).

In a preferred embodiment, the primary surface 105 includes a fold line 107 located along a center line of the primary surface 105. Such a design is sometimes called a "wrinkle" design in the motorcycle art, and such a design is often available from the manufacturer as a stock horn cover on a motorcycle, or available as an OEM accessory or upgrade on a new motorcycle.

The decorative cover 103 may also include sidewalls 109 around a majority of a perimeter of the primary surface 105, e.g., the top and sides of the primary surface 105. The sidewalls 109 may extend a first distance D1 (See FIG. 3) in a direction approximately perpendicular to the primary surface 105.

The primary surface 105 and sidewalls 109, visible to an observer when the unit 101 is mounted to a motorcycle, may be chromed. Alternatively, the primary surface 105 and sidewalls 109 may be black in color or painted to match the motorcycle's color scheme.

Figure 5:
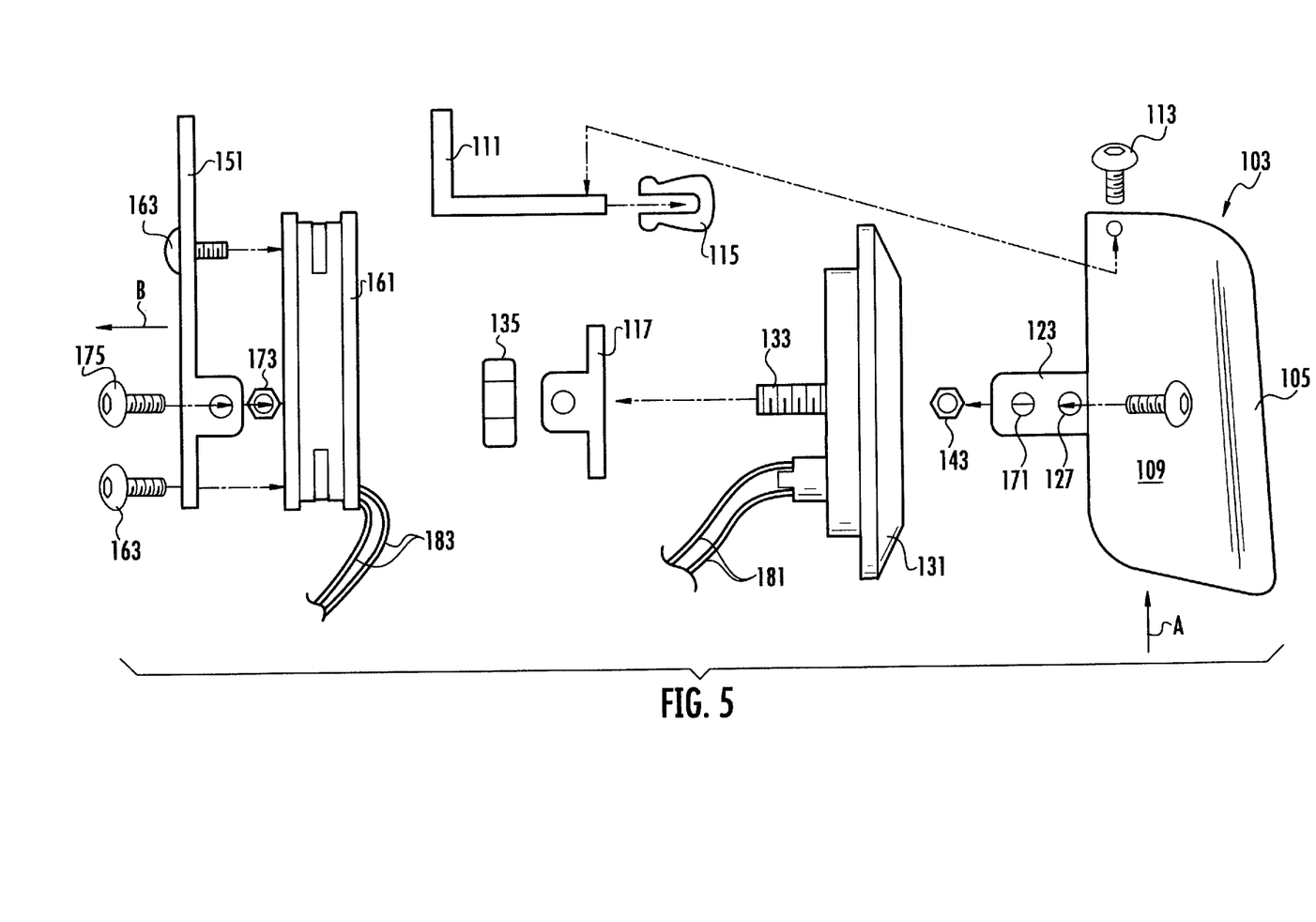
FIG. 5 is a left-side exploded view of the horn and fan combination unit in FIG. 1.

A hanging bracket 111 is attached to the top of the decorative cover 103 by a fastener 113, such as an Allen-head bolt or screw. The hanging bracket 111 is generally L-shaped in cross section (see FIG. 3). A lower leg of the hanging bracket 111 may include a first through hole surrounded by a threaded screw clip 115 (See FIGS. 5 and 6). The threaded screw clip 115 engages the threads of the fastener 113 to firmly attach the hanging bracket 111 to the decorative cover 103. An upper leg of the hanging bracket 111 may include a second through hole 116. The second through hole 116 is use to mount the unit 101 to a motorcycle, as will be more fully described in conjunction with FIG. 7.

Figure 4:
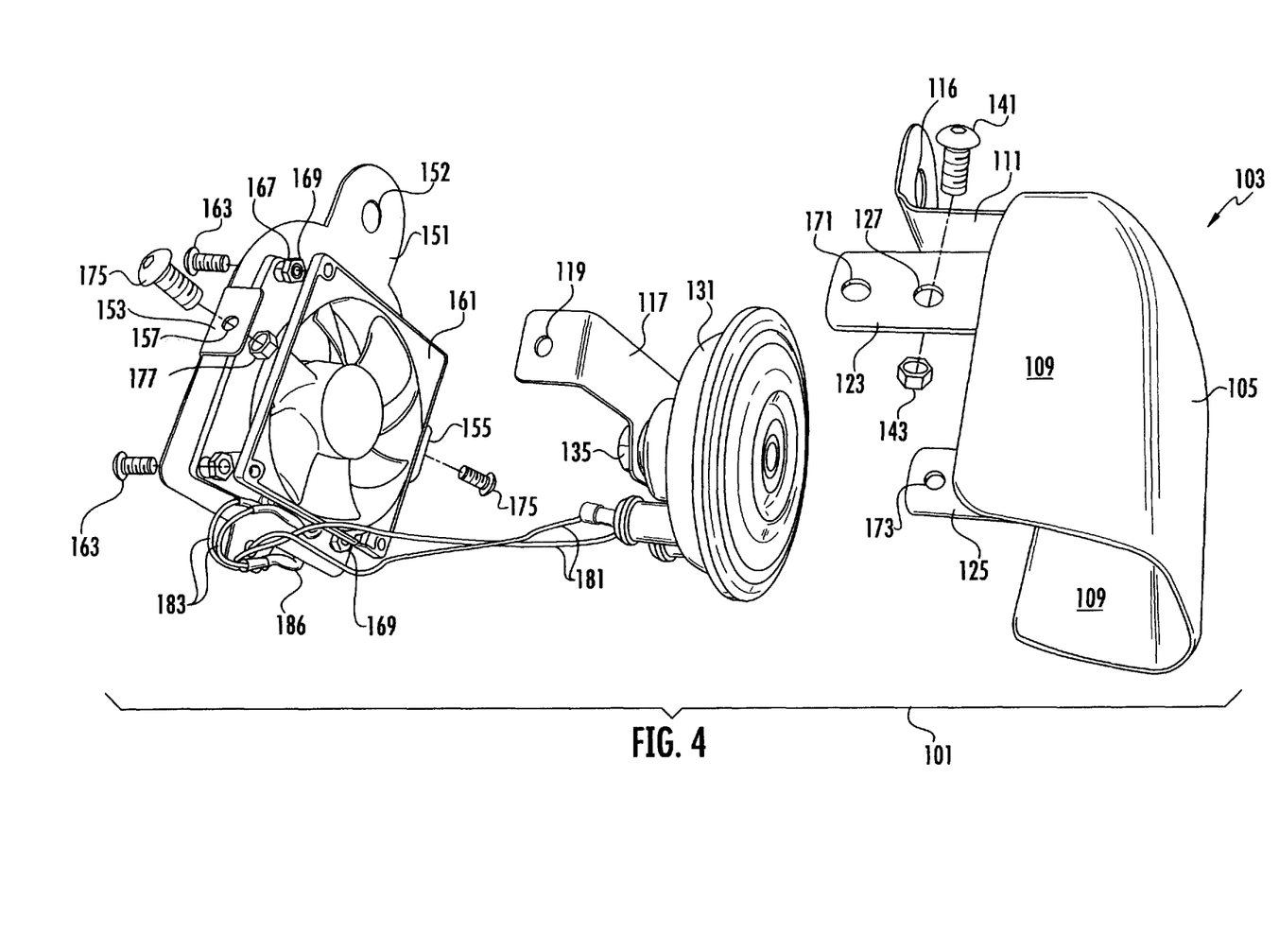
FIG. 4 is a left-front perspective, exploded view of the horn and fan combination unit in FIG. 1.
Figure 6:
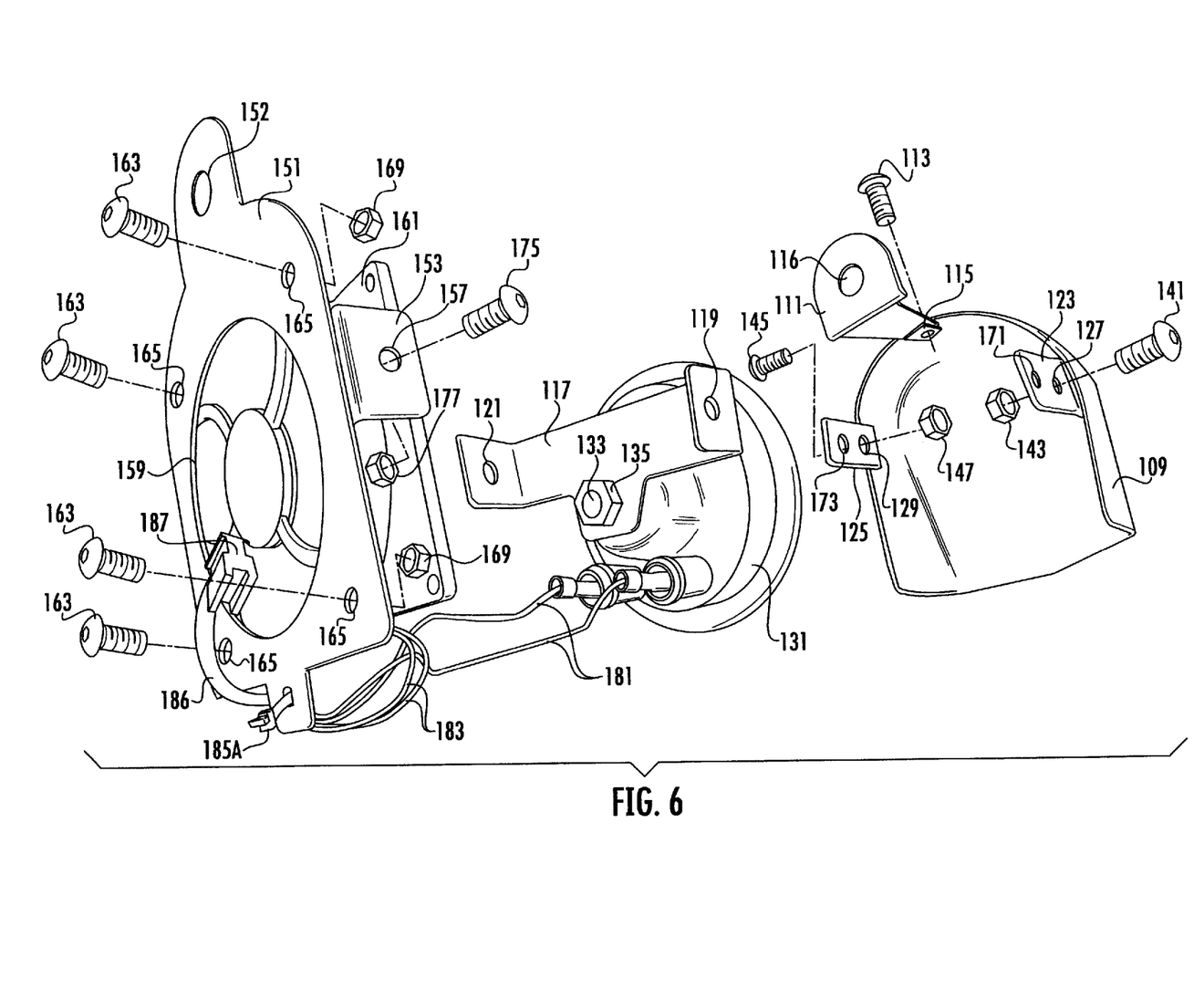
FIG. 6 is a left-rear perspective, exploded view of the horn and fan combination unit in FIG. 1.

A first bracket 117 is attached to the decorative cover 103. As best seen in FIGS. 4 and 6, the first bracket 117 is generally U-shaped, and includes first and second mounting holes 119 and 121 at lateral ends thereof and a larger third mounting hole in the center thereof. A horn 131 has a threaded stud 133 extending from a backside thereof. The threaded stud 133 is passed through the third mounting hole, and the horn 131 is firmly attached to the first bracket 117 via a nut 135. The horn 131 is preferably a twelve volt horn, such as a horn made by Wolo.

The sidewalls 109 of the decorative cover 103 include first and second mounting tabs 123 and 125. The first mounting tab 123 includes a fourth mounting hole 127, and the second mounting tab 125 includes a fifth mounting hole 129. The first bracket 117 is attached to the decorative cover 103 by passing a threaded fastener 141 through the fourth mounting hole 127 and the first mounting hole 119 and then engaging the threaded fastener 141 with a nut 143. Also, a threaded fastener 145 is passed through the fifth mounting hole 129 and the second mounting hole 121 and then engaged with a nut 147. When assembled, the horn 131 is located behind the decorative cover 103 so as to be hidden from view when the decorative cover 103 is viewed from an angle being approximately perpendicular to the primary surface 105.

A second bracket 151 is attached to the decorative cover 103. As best seen in FIGS. 4 and 6, the second bracket 151 is generally plate-shaped and includes first and second upturned ears 153 and 155. Sixth and seventh mounting holes 157 are formed in the first and second upturned ears 153 and 155, respectively. A large central opening 159 is formed in the center of the plate-shaped second bracket 151 to accommodate air flow. A third through hole 152 is formed at the top of the second bracket 151 and will be aligned to the second through hole 116 of the hanging bracket 111 when the unit 101 is assembled.

A fan 161 is attached to the second bracket 151 via four fasters 163 passing through four screw holes 165 in the second bracket 161, through four screw holes 167 in a housing of the fan 161, and being engaged by four nuts 169. The fan 161 is preferably a twelve volt fan, such as a fan made by Jaro, which draws low amperage, e.g., about 0.55 amps or less.

The first and second mounting tabs 123 and 125 of the decorative cover 103 also include eighth and ninth mounting holes 171 and 173, respectively. The second bracket 151 is attached to the decorative cover 103 by passing threaded fasteners 175 through the sixth and seventh mounting holes 157 and the eight and ninth mounting holes 171 and 173, respectively, and then engaging the threaded fasteners 175 with nuts 177. When assembled, the fan 161 is located behind the horn 131, so as to be hidden from view when the decorative cover 103 is viewed from an angle being approximately perpendicular to the primary surface 105. The spacing between the fan 161 and the horn 131 is rather close, e.g., there may be a space gap of approximately two inches or less between the fan 161 and the horn 131.

The horn 131 includes electrical leads 181 and the fan 161 includes electrical leads 183. In a preferred embodiment, the electrical leads 181 and 183 are banded together by a zip tie 185A (FIG. 6) and/or a strap 185B (FIG. 3) and/or protected by a common jacket 186, e.g., heat shrink wrap or electrical tape (FIGS. 3, 4 and 6), and are eventually terminated to a common electrical plug 187.

Once assembled, the horn 131 is overlapping the fan 161 in a direction perpendicular to the primary surface 105 of the decorative cover 103. In a preferred embodiment, at least 60% of the horn 131 is overlapping the fan 161, more particularly the blades of the fan 161. In a most preferred embodiment, at least 80% of the horn 131 is overlapping the fan 161, more particularly the blades of the fan 161. This results in a very compact arrangement such that the unit 101 takes up approximately, the same space as a conventional OEM horn and appears to observers of a motorcycle to be nothing more than an OEM horn.

Figure 3:
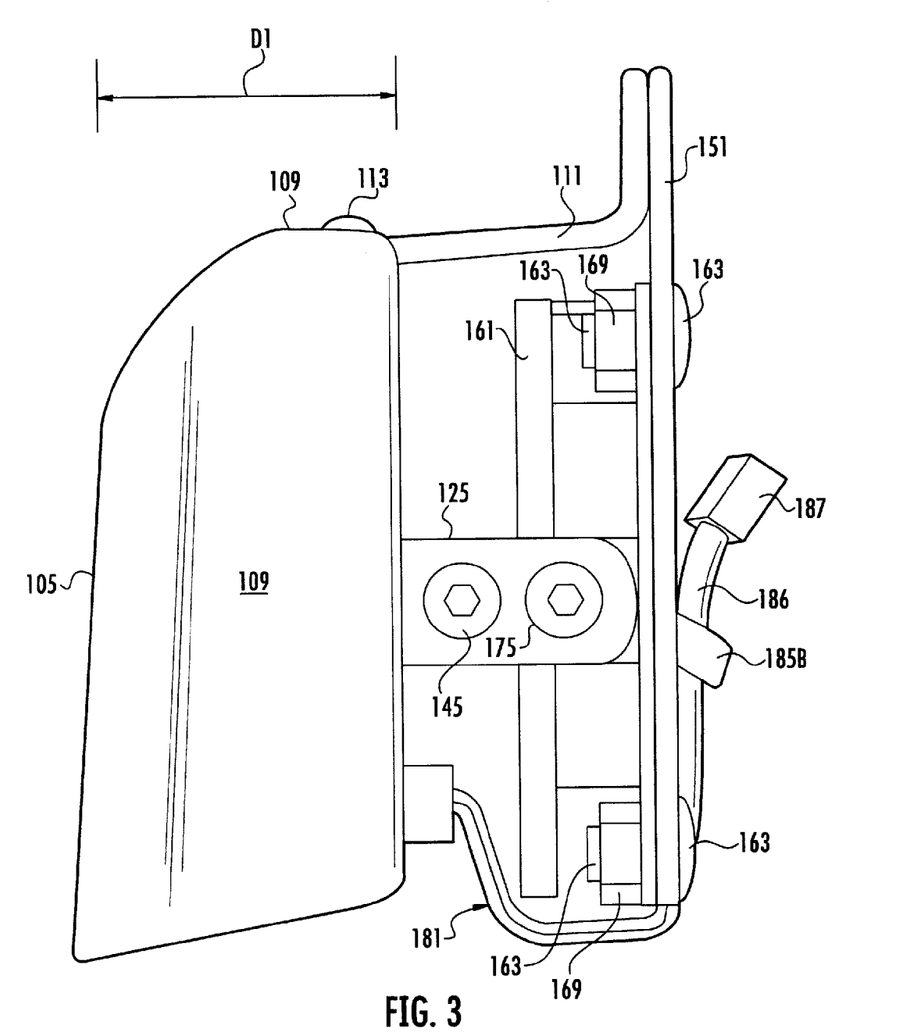
FIG. 3 is a right side view of the horn and fan combination unit in FIG. 1.

As to the compact nature, the horn 131 resides within an area defined by the primary surface 105 and the sidewalls 109 with no portion of the horn 131 (other than the electrical leads and/or terminals connected to the horn 131) residing beyond the sidewalls 109, as best seen in the side view of FIG. 3.

The fan 161 resides behind the horn 131. The fan 161 moves air along a path approximately perpendicular to the primary surface 105 of the decorative cover 103 (direction B in FIG. 5) and also moves air along a path approximately parallel to the primary surface 105 of the decorative cover 103 (direction A in FIG. 5). Preferably, the fan 161 pulls air from the direction approximately parallel (Direction A) to the primary surface 105 of the decorative cover 103 and pushes air exiting the fan 161 in the direction approximately perpendicular (Direction B) to the primary surface 105 of the decorative cover 103. Of course, the directions could be reversed if desired. By having a solid surface for the primary surface 105 of the decorative cover 103, the air is drawn into the fan 161 from a direction away from the rider's leg, which greatly reduces the potential to capture the rider's pant leg. Also, the fan 161 is not visible to an observer on the lateral side of the motorcycle.

Figure 7:
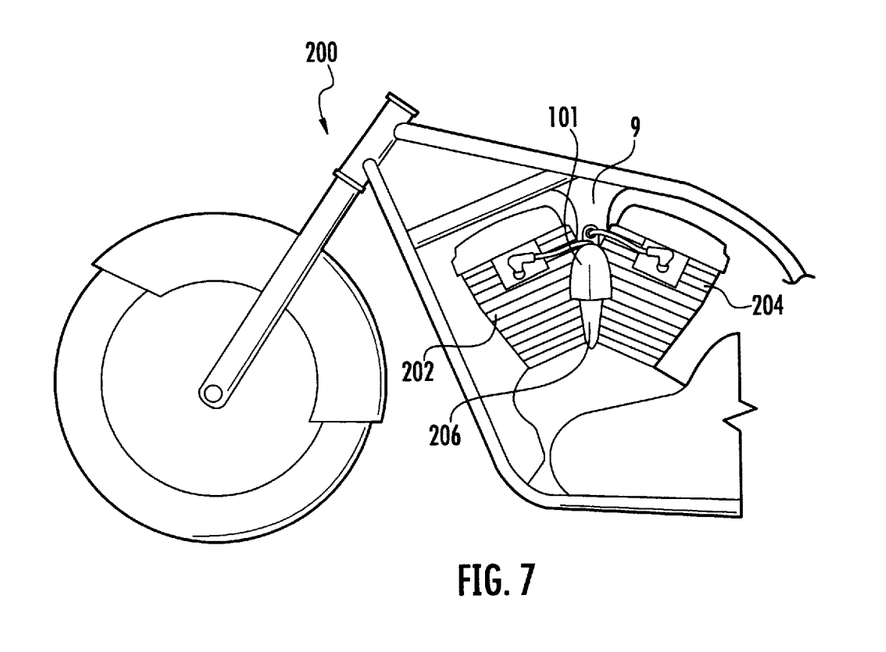
FIG. 7 is a side view of a front portion of a motorcycle with the fan and horn combination unit of FIG. 1 mounted thereto, in accordance with the present invention.

FIG. 7 illustrates the unit 101 mounted to a motorcycle 200. The motorcycle 200 includes an engine with at least one first cylinder 202 having an axis extending in a first direction and at least one second cylinder 204 having an axis extending in a different, second direction. A V-shaped void space 206 resides between the first and second cylinders 202 and 204. The horn and fan combination unit 101 overlaps with the V-shaped void space 206, as viewed from a lateral side of the motorcycle.

In a preferred embodiment, the direction approximately perpendicular to the primary surface 105 of the decorative cover 103 is also approximately perpendicular to a plane including the lateral side of the motorcycle 200, wherein the plane including the lateral side of the motorcycle 200 would be coincident with the page depicting the view in FIG. 7. In the preferred embodiment, the fan 161 would push air in the direction B in FIG. 5, and such air would pass through the V-shaped void space 206 between the first and second cylinders 202 and 204.

In accordance with one embodiment of the present invention, the fan and horn combination unit 101 utilizes the same bracket 9 for attachment to the motorcycle 200, such as the OEM bracket 9, originally used to support the OEM horn. In a preferred embodiment, the fan 161 is located between the horn 131 and the V-shaped void space 206 of the motorcycle's engine.

Although the drawings have depicted a horn 131, it would be possible to eliminate the horn 131 and its bracket 117. For example, the motorcycle operator may have included custom air horns on the motorcycle 200, and does not need to include an electric horn 131 in the unit 101.

Although a preferred embodiment of the invention is for employment in combination with a V-twin engine, the horn and fan combination unit 101 of the present invention could be used to cool the cylinder or cylinders of other engine designs. For example, a V-quad style engine with two front cylinders and two rear cylinders could employ the horn and fan combination unit 101 of the present invention to cool the rear two cylinders. Also, the horn and fan combination unit 101 could be used to provide supplemental cooling to the cylinder(s) of engines where the cylinder(s) are not serially located in the direction of travel of the motorcycle, but are parallel to each other in the direction of travel of the motorcycle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A motorcycle accessory unit comprising:
a decorative cover having a primary surface;
a bracket attached to said decorative cover; and
a fan attached to said bracket, said fan being located behind said decorative cover so as to be hidden from view when said decorative cover is viewed from an angle being approximately perpendicular to said primary surface,
wherein said bracket is a second bracket, and further comprising:
a first bracket attached to said decorative cover;
a horn attached to said first bracket, said horn being located behind said decorative cover so as to be hidden from view when said decorative cover is viewed from an angle being approximately perpendicular to said primary surface, said fan being located behind said horn, wherein in a direction perpendicular to said primary surface of said decorative cover, said horn is overlapping said fan.

2. The motorcycle accessory unit of claim 1, wherein said primary surface of said decorative cover is formed as a solid surface.

3. The motorcycle accessory unit of claim 1, wherein in a direction perpendicular to said primary surface of said decorative cover, at least 60% of said horn is overlapping said fan.

4. The motorcycle accessory unit of claim 1, wherein said decorative cover includes sidewalls around a majority of a perimeter of said primary surface, and wherein said sidewalls extend a first distance approximately perpendicular to said primary surface, and wherein said horn resides within an area defined by said primary surface and said sidewalls.

5. The motorcycle accessory unit of claim 1, wherein said horn is spaced a distance of about 2 inches or less from said fan.

6. The motorcycle accessory unit of claim 1, wherein said primary surface of said decorative cover is a surface presenting the largest area of the decorative cover, as considered from all perspective views of said decorative cover.

7. The motorcycle accessory unit of claim 6, wherein said primary surface includes a fold line located along a center line of said primary surface.

8. The motorcycle accessory unit of claim 1, wherein said fan moves air along a path approximately perpendicular to said primary surface of said decorative cover and also moves air along a path approximately parallel to said primary surface of said decorative cover.

9. A motorcycle horn and fan combination unit comprising:
a decorative cover having a primary surface;
a first bracket attached to said decorative cover;
a horn attached to said first bracket, said horn being located behind said decorative cover;
a second bracket attached to said decorative cover; and
a fan attached to said second bracket, wherein in a direction perpendicular to said primary surface of said decorative cover, said horn is overlapping said fan.

10. The motorcycle horn and fan combination unit of claim 9, wherein in a direction perpendicular to said primary surface of said decorative cover, at least 60% of said horn is overlapping said fan.

11. The motorcycle horn and fan combination unit of claim 9, wherein in a direction perpendicular to said primary surface of said decorative cover, at least 80% of said horn is overlapping said fan.

12. The motorcycle horn and fan combination unit of claim 9, wherein said primary surface of said decorative cover is a surface presenting the largest area of the decorative cover, as considered from all perspective views of said decorative cover, and wherein said primary surface of said decorative cover is formed as a solid surface.

13. The motorcycle horn and fan combination unit of claim 12, wherein said primary surface includes a fold line located along a center line of said primary surface.

14. A motorcycle horn and fan combination unit comprising:
a decorative cover having a primary surface;
a first bracket attached to said decorative cover;
a horn attached to said first bracket, said horn being located behind said decorative cover;
a second bracket attached to said decorative cover; and
a fan attached to said second bracket, wherein said fan moves air along a path approximately perpendicular to said primary surface of said decorative cover and also moves air along a path approximately parallel to said primary surface of said decorative cover.

15. The motorcycle horn and fan combination unit of claim 14, wherein said fan pulls air from the direction approximately parallel to said primary surface of said decorative cover and pushes air exiting said fan in the direction approximately perpendicular to said primary surface of said decorative cover.

16. A combination comprising:
a motorcycle; and
a motorcycle horn and fan combination unit including:
a decorative cover having a primary surface;
a first bracket attached to said decorative cover;
a horn attached to said first bracket, said horn being located behind said decorative cover so as to be hidden from view when said decorative cover is viewed from an angle being approximately perpendicular to said primary surface;
a second bracket attached to said decorative cover; and
a fan attached to said second bracket, said fan being located behind said horn so as to be hidden from view when said decorative cover is viewed from an angle being approximately perpendicular to said primary surface, wherein in a direction perpendicular to said primary surface of said decorative cover, said horn is overlapping said fan and wherein said fan moves air along a path approximately perpendicular to said primary surface of said decorative cover and also moves air along a path approximately parallel to said primary surface of said decorative cover.

17. The combination of claim 16,
wherein said motorcycle includes an engine with at least one first cylinder having an axis extending in a first direction and at least one second cylinder having an axis extending in a different, second direction,
wherein a V-shaped void space resides between said first and second cylinders; and
wherein said motorcycle horn and fan combination unit overlaps with said V-shaped void space, as viewed from a lateral side of said motorcycle.

18. The combination of claim 17, wherein said fan pushes air exiting said fan through said V-shaped void space between said first and second cylinders.

19. The combination of claim 18, wherein the direction approximately perpendicular to said primary surface of said decorative cover extends approximately perpendicular to a plane of the lateral side of said motorcycle.

\* \* \* \* \*